United States Patent
Chu et al.

(10) Patent No.: US 12,021,950 B2
(45) Date of Patent: Jun. 25, 2024

(54) MULTI-LINK COMMUNICATIONS

(71) Applicant: NXP USA, INC., Austin, TX (US)

(72) Inventors: Liwen Chu, San Ramon, CA (US);
Hongyuan Zhang, Fremont, CA (US);
Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 172 days.

(21) Appl. No.: 17/105,212

(22) Filed: Nov. 25, 2020

(65) Prior Publication Data

US 2021/0160347 A1     May 27, 2021

Related U.S. Application Data (60) Provisional application No. 62/940,764, filed on Nov. 26, 2019.

(51) Int. Cl.
*H04L 69/14*     (2022.01)
*H04L 69/322*     (2022.01)

(52) U.S. Cl.
CPC .......... *H04L 69/14* (2013.01); *H04L 69/322* (2013.01)

(58) Field of Classification Search
CPC ..... H04W 28/06; H04W 76/15; H04W 8/005; H04W 80/02; H04W 88/06
See application file for complete search history.

(56) References Cited

U.S. PATENT DOCUMENTS

| | | | |
|---|---|---|---|
| 10,111,185 B2 | 10/2018 | Chu et al. | |
| 2019/0280919 A1* | 9/2019 | Sadeghi | H04W 72/04 |
| 2020/0288523 A1* | 9/2020 | Patil | H04W 80/02 |
| 2021/0076422 A1* | 3/2021 | Akhmetov | H04W 52/0248 |
| 2021/0168868 A1* | 6/2021 | Jang | H04L 5/0053 |
| 2021/0329698 A1* | 10/2021 | Jang | H04W 74/0816 |
| 2022/0053559 A1* | 2/2022 | Jang | H04W 74/0808 |

OTHER PUBLICATIONS

Wi-Fi Alliance, "Multi-AP Specification," Verision 1.0, May 18, 2018; 66 pages.
U.S. Appl. No. 17/005,888, filed Aug. 28, 2020, entitled: "Wireless Communication Apparatus and Wireless Communication Methods Based on Link Use Capabilities of Multi-Link Devices." The Examiner is referred to the copending patent prosecution of the common Applicant (no attachment).
U.S. Appl. No. 16/911,102, filed Jun. 24, 2020, entitled: "Multi-Band Sharing in a Wireless Communication System." The Examiner is referred to the copending patent prosecution of the common Applicant (no attachment).

\* cited by examiner

*Primary Examiner* — Romani Ohri (57) ABSTRACT

Aspects of the disclosure are directed to an apparatus having a multi-link device (MLD) including processing circuitry to communicate signals with one of a plurality of remote devices over multiple communications link. The MLD and the one of the remote devices operate in first and second communication-specific configurations as follows. A physical layer convergence procedure protocol data unit (PPDU) is transmitted in one of the links while a PPDU is communicated in another one of the links under a first configuration. A PPDU is communicated in a first one of the respective communications links with an ending time set based on a PPDU communicated in a second one of the respective communications links in a second configuration. Such approaches may be carried out based on capabilities relating to simultaneous transmission and reception of MLDs that are communicating.

17 Claims, 3 Drawing Sheets

MULTI-LINK COMMUNICATIONS

OVERVIEW

Aspects of various embodiments are directed to effecting communications between respective communications devices in multi-link communication scenarios.

Various communications involve transmitting data between devices over one or multiple channels using communication protocols that direct characteristics of the communications. For single-channel communications, use of the channel can be challenging to manage when multiple devices may utilize the single channel. For multi-channel communications, coordination of communications on respective channels can also be challenging, for example to ensure devices can properly receive data communicated on the channel.

Certain communication scenarios utilize backoff deferral to provide a backoff period of time during which another communication may progress, for instance to avoid improper decoding in a particular channel or link due to a transmission in another channel or link. For instance, when certain communications overlap and a communication cannot be decoded, the unsuccessful transmission can be treated as collision.

These and other matters have presented challenges to efficiencies of communications implementations, such as multi-link communications implementations, for a variety of applications.

SUMMARY

Various example embodiments are directed to issues such as those addressed above and/or others which may become apparent from the following disclosure concerning apparatuses and methods involving the communication over multiple channels between a multi-link device (MLD) and another device as may also be a MLD. Such aspects can be implemented under conditions in which one or both devices are capable of simultaneous transmission and reception (STR).

In certain example embodiments, aspects of the present disclosure involve a communications apparatus that communicates over multiple links, with the communication over a particular link being effected based on end times of communications on another link.

In a more specific example embodiment, a communications circuit includes a multi-link device (MLD) having processing circuitry to communicate signals with one of a plurality of remote devices over multiple communications link. The MLD and the one of the remote devices operate in first and second communication-specific configurations as follows. A physical layer convergence procedure protocol data unit (PPDU) is transmitted in one of the links while a PPDU is communicated in another one of the links under a first configuration. A PPDU is communicated in a first one of the respective communications links with an ending time set based on a PPDU communicated in a second one of the respective communications links in a second configuration.

Another embodiment is directed to an apparatus comprising a communications circuit configured and arranged to communicate with a plurality of remote devices over multiple communications links, and a multi-link device (MLD) including processing circuitry configured and arranged with the communications circuit to facilitate the communication of signals between the MLD and one of the remote devices. In response to both the MLD and the one of the remote devices being configured for concurrent transmission and reception of signals over respective communications links, PPDUs are communicated in respective ones of the communications links, including transmitting a PPDU in one of the links while a PPDU is communicated in another one of the links. In response to one of the MLD and the one of the remote devices being configured for concurrent transmission and reception of signals over respective communications links, and to the other one of the MLD and the one of the remote devices not having capability for concurrent transmission and reception of signals over the respective communications links, a PPDU is communicated in a first one of the respective communications links with an ending time set based on a PPDU communicated in a second one of the respective communications links.

Another embodiment is directed to a method for communicating using a multi-link device (MLD) operable to facilitate the communication of signals between the MLD and one of a plurality of remote devices over multiple communications links. PPDUs are communicated in respective ones of the communications links, including transmitting a PPDU in one of the links while a PPDU is communicated in another one of the links, in response to an MLD and the one of the plurality of remote devices being configured for concurrent transmission and reception of signals over the communications links. In response to one of the MLD and the one of the remote devices being configured for concurrent transmission and reception of signals over respective communications links, and to the other one of the MLD and the one of the remote devices not having capability for concurrent transmission and reception of signals over the respective communications links, a PPDU is communicated in a first one of the respective communications links with an ending time set based on a PPDU communicated in a second one of the respective communications links.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving multi-link communications in environments involving communications devices of varying capabilities. In certain implementations, aspects of the present disclosure have been shown to be beneficial when used in the context of facilitating MLD communications involving access points, stations or other communications devices that may or may not have capabilities for simultaneous transmission and reception. In some embodiments, the communication of data is controlled based on capabilities of respective devices in a particular communication scenario. For instance, the communication of data between devices using in a particular link may be effected based upon corresponding communication of data in another link according to communication capabilities of one or both devices. While not necessarily so limited, various aspects may be appreciated through the following discussion of non-limiting examples which use exemplary contexts.

In the following description various details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various aspects of the disclosure are directed to data exchanges between a first device, such as an access point (AP) MLD, and a second device such as a wireless station (STA) MLD. The AP MLD includes two or more AP circuits for communicating on different links, and may have transmitting while receiving capability (STR) or may have no transmitting while receiving (NSTR) capability. Similarly the STA MLD has a two or more STA circuits that communicate on the different links and have either STR capability or no STR capability. The AP MLD is operable to communicate data in a manner that is responsive to STR or NSTR capabilities of the STA MLD and of the AP MLD itself, along with current communication characteristics of the channel.

Accordingly, decisions as to whether to transmit a particular data unit, or as to how to transmit such a data unit (e.g., with an end time aligned to that of another data unit), can be made accordingly to ensure that the transmission and reception of the data unit is successful. For instance, the communication of a PPDU may be effected such that ending times of respective PPDUs that are concurrently communicated is coordinated as may be useful, for example, to ensure coordinated interframe space between the communication of respective frames and other related communications (e.g., acknowledgement (ACK)). One such approach may involve shortening a PPDU communicated on a particular link and started after a PPDU communicated on another link, such that both PPDUs end at the same time. In situations where coordination is determined not to be necessary (e.g., where and ACK is not to be sent), such alignment can be neglected. Furthermore, backoff can be performed as necessary to delay transmission over a particular channel relative to communication on another channel, examples of which are further characterized herein in connection with MLDs that have STR and those that do not.

In certain implementations, the first device may further communicate with a STA that works in a single link (e.g., as may be referred to as a legacy STA). In such an instance, communication over the single link is effected without utilizing multichannel characteristics of the AP MLD.

In a more specific example embodiment, a communications circuit includes a MLD having processing circuitry to communicate signals with one of a plurality of remote devices over multiple communications link. The MLD and the one of the remote devices operate in first and second communication-specific configurations as follows. A PPDU is transmitted in one of the links while a PPDU is communicated in another one of the links under a first configuration. A PPDU is communicated in a first one of the respective communications links with an ending time set based on a PPDU communicated in a second one of the respective communications links in a second configuration.

The MLD may operate in the first communication-specific configuration in response to both the MLD and the one of the remote devices being configured for concurrent transmission and reception of signals over respective communications links. The MLD may operate in the second communication-specific configuration in response to a first one of the MLD and the one of the remote devices being configured for concurrent transmission and reception of signals over respective communications links, and a second one of the MLD and the one of the remote devices not having capability for concurrent transmission and reception of signals over the respective communications links. For instance, one MLD may have STR capability and the other MLD may not have STR capability, under which circumstance PPDU communication can be set accordingly.

The MLD may communicate the PPDU in the first one of the respective communications links with an ending time set based on the PPDU communicated in the second one of the respective communications links using one or more of the following approaches. The ending time of the PPDU in the first link may be set without reference to an ending time of the PPDU in the second link in response to the PPDUs in the first and second links not soliciting an Ack/BA (acknowledge/block acknowledge) response in accordance with a short inter-frame space (SIFS) time interval. If the PPDU in the first link solicits an Ack/BA response in accordance with the SIFS, an ending time of the PPDU in the second link may be set such that it is not later than an ending time of the PPDU in the first link. If both of the PPDUs in the first and second links solicit Ack/BA responses in accordance with the SIFS, the ending time of the PPDUs may be set to be the same ending time. If both the MLD and the one of the remote devices are capable of concurrent transmission and reception of signals over respective communications links, the ending time of the PPDU communicated in one of the links may be set without reference to an ending time of the PPDU in the other one of the links. The MLD may further be configured to facilitate the communication of signals with one of the remote devices requiring non-multi-link communications over a single channel.

Another embodiment is directed to an apparatus comprising a communications circuit configured and arranged to communicate with a plurality of remote devices over multiple communications links, and a multi-link device (MLD) including processing circuitry configured and arranged with the communications circuit to facilitate the communication of signals between the MLD and one of the remote devices. In response to both the MLD and the one of the remote devices being configured for concurrent transmission and reception of signals over respective communications links, PPDUs are communicated in respective ones of the communications links, including transmitting a PPDU in one of the links while a PPDU is communicated in another one of the links. In response to one of the MLD and the one of the remote devices being configured for concurrent transmission and reception of signals over respective communications links, and to the other one of the MLD and the one of the remote devices not having capability for concurrent transmission and reception of signals over the respective communications links, a PPDU is communicated in a first one of the respective communications links with an ending time set based on a PPDU communicated in a second one of the respective communications links.

The MLD may communicate the PPDU in the first one of the respective communications links with an ending time set based on the PPDU communicated in the second one of the respective communications links in accordance with one or more of the following. The ending time of the PPDU in the first link may be set without reference to an ending time of the PPDU in the second link in response to the PPDUs in the first and second links not soliciting an Ack/BA response in accordance with a SIFS time interval. If the PPDU in the first link solicits an Ack/BA response in accordance with the SIFS, an ending time of the PPDU in the second link may be set to be not later than an ending time of the PPDU in the first link. If both of the PPDUs in the first and second links solicit Ack/BA responses in accordance with the SIFS, the ending time of the PPDUs may be set to the same ending time.

The MLD may communicate the PPDUs in respective ones of the communications links using a backoff procedure, including delaying communications of a first PPDU in one of the communications links based on communications in another one of the communications links. For instance, the first PPDU may be communicated in response to determining that communication of the PPDU will not interfere with communication of a PPDU in a corresponding communication link.

Another embodiment is directed to a method for communicating using a multi-link device (MLD) operable to facilitate the communication of signals between the MLD and one of a plurality of remote devices over multiple communications links. PPDUs are communicated in respective ones of the communications links, including transmitting a PPDU in one of the links while a PPDU is communicated in another one of the links, in response to an MLD and the one of the plurality of remote devices being configured for concurrent transmission and reception of signals over the communications links. In response to one of the MLD and the one of the remote devices being configured for concurrent transmission and reception of signals over respective communications links, and to the other one of the MLD and the one of the remote devices not having capability for concurrent transmission and reception of signals over the respective communications links, a PPDU is communicated in a first one of the respective communications links with an ending time set based on a PPDU communicated in a second one of the respective communications links.

The method of communicating the PPDU in the first one of the respective communications links with an ending time set based on the PPDU communicated in the second one of the respective communications links may involve one or more of the following. The ending time of the PPDU in the first link without reference to an ending time of the PPDU in the second link in response to the PPDUs in the first and second links not soliciting an Ack/BA response in accordance with a SIFS time interval. If the PPDU in the first link solicits an Ack/BA response in accordance with the SIFS, an ending time of the PPDU in the second link may be set to be not later than an ending time of the PPDU in the first link. If both of the PPDUs in the first and second links solicit Ack/BA responses in accordance with the SIFS, the ending time of the PPDUs may be set to the same ending time. The ending time of a PPDU may be set without reference to an ending time of a PPDU in another link when MLDs communicating in both links are configured for concurrent transmission and reception of signals. The method may further utilize a backoff procedure involving delaying communications of a first PPDU in one of the communications links based on communications in another one of the communications links.

For general information regarding communications transmissions, and for specific information regarding backoff communications as may be implemented in accordance with one or more embodiments herein, reference may be made to U.S. Pat. No. 10,111,185, which is fully incorporated herein by reference. Furthermore, certain embodiments are characterized in and/or otherwise may be implemented in accordance with the underlying provisional application to which priority is claimed, U.S. Provisional Application Ser. No. 62/940,764, which is also fully incorporated herein by reference.

Figure 1:
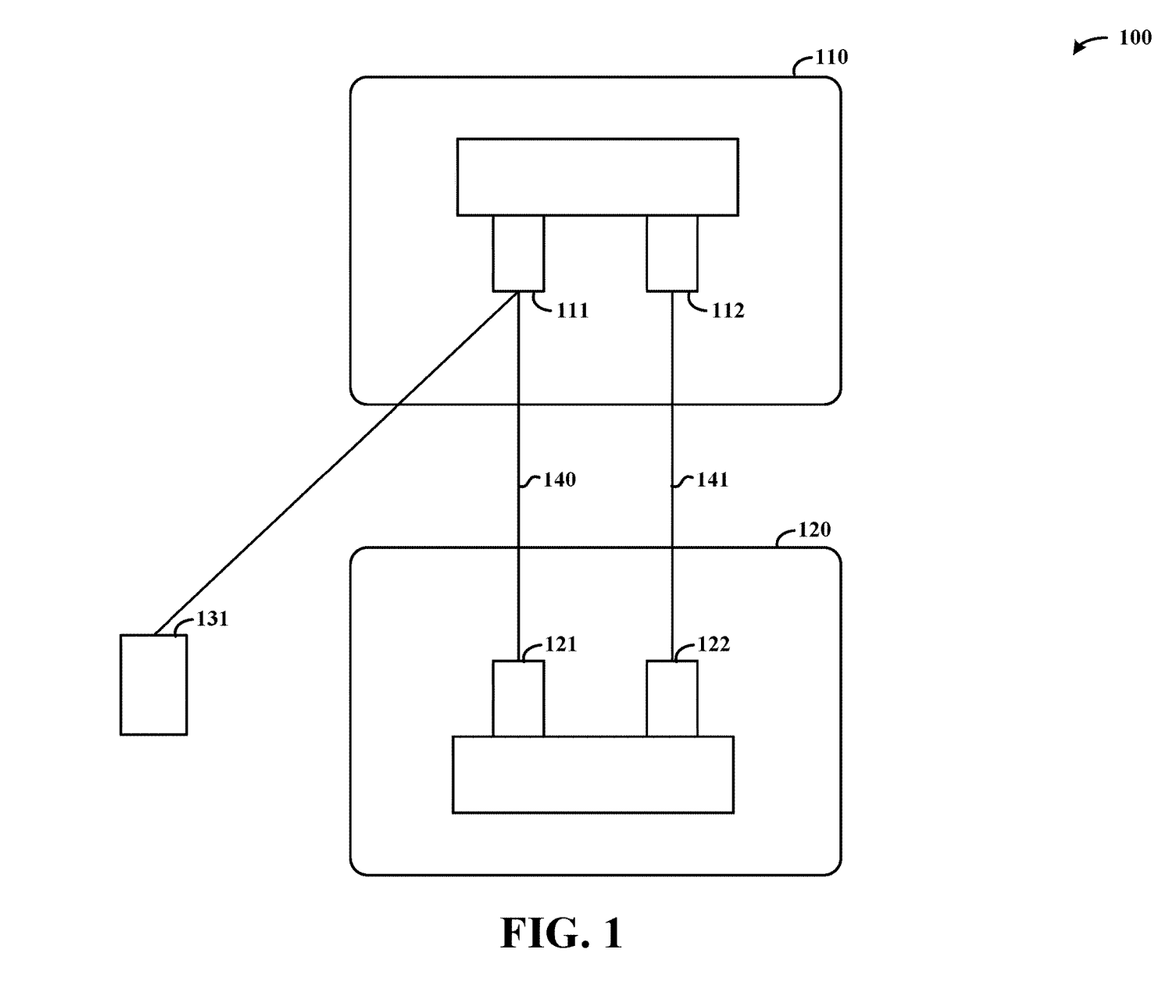
FIG. 1 shows a system for multi-link communications, as may be implemented in accordance with the present disclosure.

Turning now to the figures, FIG. 1 shows a system 100 involving multi-link communications, as may be implemented in accordance with one or more aspects of the disclosure. MLD 110 is shown including respective communication circuits 111 and 112 for communicating on respective links, and another MLD 120 is shown having respective communication circuits 121 and 122 for respectively communicating with communication circuits 111 and 112 as shown. A single-link communication circuit 131 is also shown, which may be implemented with the system 100. The system 100 operates in accordance with one or more embodiments herein, in which PPDU communications over links 140 and 141 are managed based on capabilities of the MLD 110 and MLD 120 relative to concurrent transmission and reception (e.g., with an end time of a PPDU to be communicated selectively set based on end times of a PPDU being currently communicated, based on transmission and reception capabilities of the respective MLDs. Such aspects may, for example, be implemented in accordance with the approaches depicted in and described in connection with FIGS. 2-8.

Certain embodiments are directed to the MLD 110, other embodiments are directed to the MLD 120, and still other embodiments are directed to the system 100 as including both MLD 110 and MLD 120. For instance, MLD 110 may be implemented with circuits 111 and 112 operating as access points (e.g., for transmitting and receiving wireless signals). MLD 120 may be implemented with circuits 121 and 122 as wireless communication stations for communicating with the respective access points. When utilized, the communication circuit 131 may be operated as a station with single-channel communication capabilities (e.g., as may be referred to as a legacy station).

As may also be implemented with FIG. 1 or using other apparatuses/approaches, certain embodiments involve carrying out STR functionality through an entire wireless network basic service set (BSS), for instance as implemented via the IEEE 802.11 standard. For example, a multi-link logical AP entity may announce whether all multi-link logical AP/non-AP entities support transmission (Tx) on one link while concurrently receiving (Rx) on another link (STR) for a pair of two links. If for a pair of two links, link1 and link2 (e.g., link 140 and link 141), a multi-link logical AP entity announces that all multi-link logical AP/non-AP (e.g., STA) entities support Tx on one link while concurrently Rx on another link, the multi-link AP logical entity and the multi-link non-AP logical entities may operate as follows:

When detecting a PPDU in link1, a one of the multi-link logical entities continues backoff in link2.

When detecting a PPDU in link1, one of the multi-link logical entities transmits a PPDU in link2 without considering the length of the PPDU in link1.

Furthermore, if for each pair of two links a multi-link logical AP entity announces that all multi-link logical AP/non-AP entities support Tx on one link while concurrently Rx on another link, the multi-link AP logical entity and the multi-link STA logical entities may operate such that multi-link the multi-link AP logical entity accepts the association of a legacy STA and a single link, such as an extremely high throughput (EHT) STA communication through any link.

In each of the following figures, "link1" refers to the upper link in each figure, and "link2" refers to the lower link.

Figure 2:
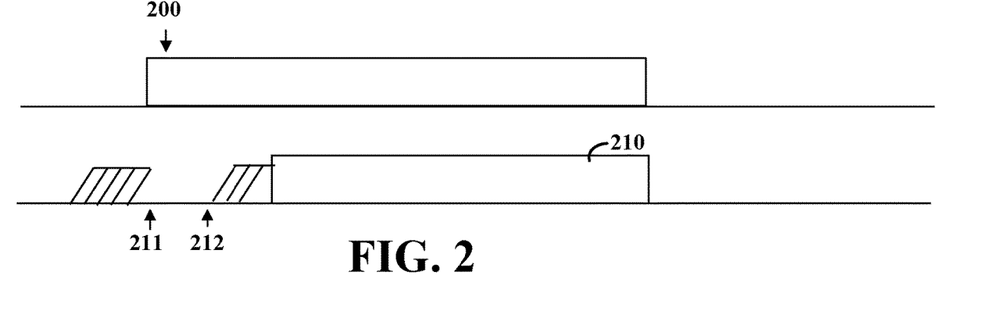
FIG. 2 is a diagram for communicating messages with backoff, in accordance with the present disclosure.

FIG. 2 shows a diagram for communicating messages with backoff in accordance with the present disclosure, for instance as may relate to link sharing capabilities. A PPDU 200 is shown as being communicated in link1, with PPDU 210 being communicated in link2. Backoff delay is shown at 211 and 212. In one implementation in which the PPDU is communicated in link1, the backoff and data unit transmission in link2 is continued. If link2's PPDU interferes with link1's PPDU, it may be treated as collision. In another implementation in which the PPDU is detected in link1, the backoff in link2 is deferred until the conclusion that link2's transmission will not interfere with link1's transmission, at which time any remaining backoff and transmission proceed (e.g., with a PPDU shortened accordingly).

Figure 3:
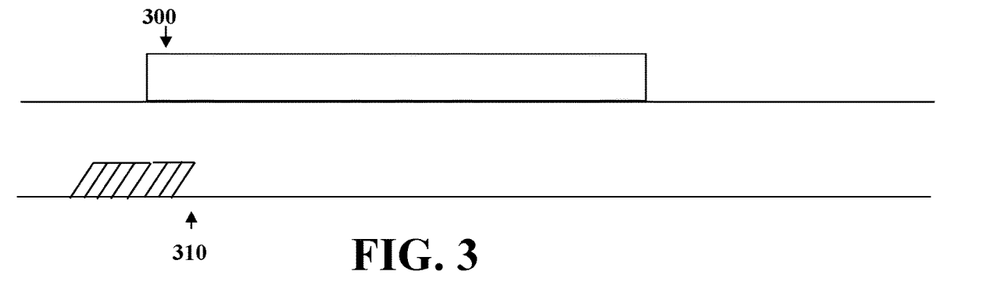
FIG. 3 is a diagram for communicating messages with backoff relative to link sharing, in accordance with the present disclosure.

FIG. 3 is a diagram for communicating messages with backoff relative to link sharing, in accordance with the present disclosure. When detecting a PPDU 300 in link1, the backoff in link2 is continued. If link2's PPDU is expected to interfere with link1's PPDU, the backoff is stopped until the end of link1's transmission operation (TXOP). If a backoff counter for link2 times out/becomes zero and it is still not clear whether a PPDU in link2 will interfere with the PPDU 300, another backoff procedure can be initiated, or the PPDU in link2 can simply be transmitted.

The following approaches may be implemented in connection with one or more other embodiments herein, such as represented in FIG. 1 (e.g., with referenced link1 corresponding to 140 and link2 to 141), or to that represented in the other figures.

Certain embodiments relate to effecting backoff with a multi-link entity without transmit and receive (T&R) capability. For instance, the multi-link entity may detect (or transmit) a PPDU in link1 while doing backoff in link2, and operate as follows. In one implementation, backoff is continued in link2, and if a backoff counter in link2 becomes 0, the multi-link entity starts transmission in link2. The reception in link1 is then stopped as the multi-link entity doesn't support T&R capability. In another implementation, backoff is continued in link2, and if the multi-link entity determines that the link1's transmission is addressed to it or that the link2's PPDUs are addressed to the initiator of link1's PPDU and that such an initiator also has no T&R capability, the multi-link entity stops its backoff in link2 until the end of the TXOP in link1, before the backoff counter in link2 becomes 0. If the backoff counter in link2 becomes 0 and the multi-link entity has not determined whether the link1's transmission is addressed to it, the multi-link entity may start transmission in link2 and reception in link1 is stopped as the multi-link entity doesn't support T&R capability.

If the multi-link entity detects (or transmits) a PPDU in link1 while doing a backoff in link2, backoff in link2 may be continued. If the multi-link entity determines either that the link1's transmission is addressed to it or that link2's PPDUs are addressed to the initiator of link1's PPDU and that the initiator has no T&R capability, the multi-link entity may stop its backoff in link2 before the backoff counter in link2 becomes 0 and until the end of TXOP in link1. If the multi-link entity determines, before the backoff counter in link2 becomes 0, that the link1's transmission isn't addressed to it and it is not true that the link2's PPDUs are addressed to the initiator of link1's PPDU under the condition in which the initiator has no T&R capability, the multi-link entity continues its backoff in link2. If the backoff counter in link2 becomes 0 and the multi-link entity has not determined whether the link1's transmission is addressed to it and whether the link2's PPDUs are addressed to the initiator of link1's PPDU in which the initiator has no T&R capability, the multi-link entity assumes an internal collision and starts another backoff procedure.

In another implementation, backoff is deferred in link2 until the multi-link entity determines whether the link1's transmission is addressed to the multi-link entity and whether the link2's PPDUs are addressed to the initiator of link1's PPDU with no T&R capability.

If the link1's transmission is not addressed to the multi-link entity and it is not true that the link2's PPDUs are addressed to an initiator of link1's PPDU where that initiator has no T&R capability, the multi-link entity resumes its backoff in link2. Otherwise link2's backoff resumes at the end of link1's TXOP.

Other embodiments are directed to managing backoff with a multi-link entity (e.g., a STA) having T&R capability. When the multi-link entity detects (e.g., transmits) a PPDU in link1 while doing backoff in link2, the following may be carried out. In one implementation, backoff in link2 is continued and if the backoff counter in link2 becomes 0, the multi-link entity starts transmission in link2. In another implementation, backoff is continued in link2 and if a backoff counter in link2 becomes 0 before the multi-link entity determines whether link2's PPDU is addressed to the initiator of link1's PPDU (where the initiator of link1's PPDU has no T&R capability), the multi-link STA entity may the transmission in link2. If the multi-link entity determines that link2's PPDUs are addressed to the initiator of link1's PPDU before the backoff counter in link2 becomes 0 and under a condition in which the initiator of link1's PPDU has no T&R capability, the multi-link STA entity stops the backoff in link2 until the end of the TXOP in link1. If, before the backoff counter in link2 becomes 0, the multi-link entity determines that link2's PPDUs are addressed to the initiator of link1's PPDU in which the initiator of link1's PPDU has T&R capability, the multi-link STA entity continues its backoff in link2. If the multi-link entity determines, before the backoff counter in link2 becomes 0, that link2's PPDUs are not addressed to the initiator of link1's PPDU, the multi-link entity continues its backoff in link2.

If a multi-link entity with T&R capability detects (or transmits) a PPDU in link1 while doing backoff in link2, backoff may be continued in link2. If a backoff counter in link2 becomes 0 and the multi-link entity has not determined whether link2's PPDU is addressed to the initiator of link1's PPDU in an instance in which the initiator of link1's PPDU has no T&R capability, the multi-link entity assumes an internal collision and starts another backoff procedure. If the multi-link entity determines that link2's PPDUs are addressed to the initiator of link1's PPDU, before the backoff counter in link2 becomes 0 and where the initiator of link1's PPDU has no T&R capability, the multi-link entity stops the backoff in link2 until the end of the TXOP in link1. If the multi-link STA entity determines that link2's PPDUs are addressed to the initiator of link1's PPDU where the initiator of link1's PPDU has T&R capability and before the backoff counter in link2 becomes 0, the multi-link STA entity continues its backoff in link2. If the multi-link entity determines that link2's PPDUs are not addressed to the initiator of link1's PPDU before the backoff counter in link2 becomes 0, the multi-link entity continues its backoff in link2.

In a particular embodiment, backoff is deferred in link2 until determining whether the link1's transmission is addressed to it or not. If the link1's transmission is from a multi-link entity without T&R capability and link2's PPDUs are addressed to the initiator of link1's transmission, backoff is resumed in link2 resumes at the end of link1's TXOP. Otherwise the multi-link entity resumes its backoff in link2.

Accordingly, various embodiments are directed toward the transmission of PPDUs in multiple links. In some embodiments, PPDUs are transmitted in different links by the same multi-link entity or multi-link entities in same device. In others, PPDUs are transmitted in different links by the different multi-link entities in different devices. PPDUs may also be transmitted in different links and addressed to the same multi-link entity or multi-link entities in same device. PPDUs in different links may be addressed to different multi-link entities in different devices.

Figure 4:
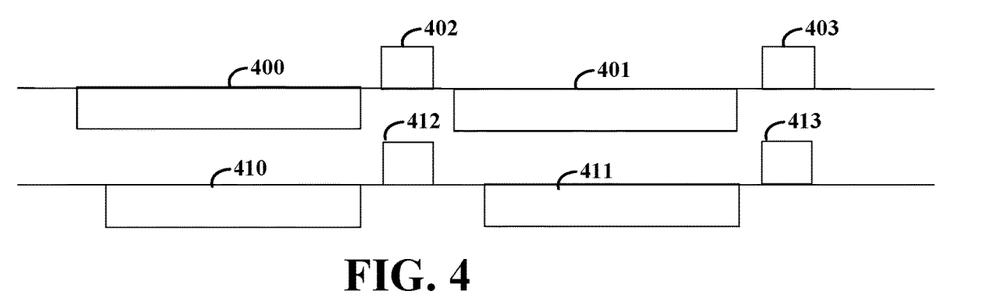
FIG. 4 is a diagram for communicating messages with transmission of physical layer convergence procedure protocol data units (PPDUs) in different links, in accordance with the present disclosure.

FIG. 4 is a diagram for communicating messages with transmission of PPDUs in different links, in accordance with the present disclosure. Link1 is shown with PPDUs 400 and 401 being transmitted, with 402 and 403 being block acknowledgement (BA) or ACK communications. Similarly, link2 is shown with PPDUs 410 and 411 with 412 and 413 being BA or ACK communications.

For applications in which PPDUs in different links can't be any length (e.g., must end at the same time), the PPDU in the TXOP that starts earlier in a link, in link1 as shown by way of example, determines the length of the PPDU in the concurrent TXOP that starts later in another link, as shown in link2 by way of example. As such, the length of the PPDU in link2 is reduced so that its ending time corresponds with that of link1. For instance, non-initial PPDUs in link2 may be deferred in order to obtain a desired PPDU length in link1. The inter-frame space can be longer than a shortest inter-frame space (SIFS) since the responding PPDUs in different links have different lengths, and the PPDU transmission in TXOP starting later is deferred to get the PPDU length in TXOP that starts earlier. In some embodiments, concurrent PPDUs are transmitted from the same multi-link entity (or different such entities in one device) to the same multi-link entity (or multi-link entities in one device), for instance if the start time of the PPDU in link2 is not earlier than the start time of a PPDU in link1.

Figure 5:
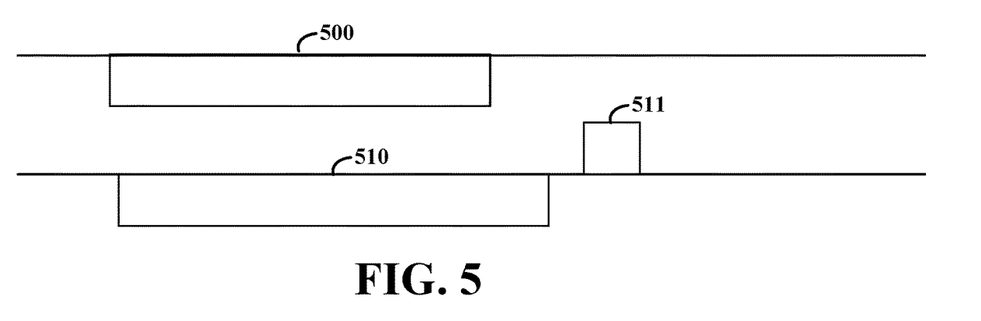
FIG. 5 is a diagram for communicating messages involving concurrent PPDUs with multi-link devices (MLDs), in accordance with the present disclosure.

FIG. 5 is a diagram for communicating messages involving concurrent PPDUs with multi-link devices (MLDs), in accordance with the present disclosure. PPDU1 500 is shown as communicated on link1, and PPDU2 510 is communicated on link2 along with an ACK or BA communication 511. When PPDU2's ending time is same as PPDU1's ending time, communications are carried out as indicated. When PPDU2's ending time is not later than PPDU1's ending time, PPDU1 solicits immediate Ack/BA with SIFS inter-frame space. Otherwise PPDU1's ending time may be the same as PPDU2's ending time, In a particular implementation, PPDU2's ending time is not related to PPDU1's ending time when both PPDU1 and PPDU2 don't solicit immediate Ack/BA with SIFS inter-frame space. PPDU2's ending time is set as not being later than PPDU1's ending time when PPDU1 solicits immediate Ack/BA with SIFS inter-frame space. PPDU2's ending time is set to the same as PPDU12's ending time if both PPDU1 and PPDU2 solicit immediate Ack/BA with SIFS inter-frame space.

Figure 6:
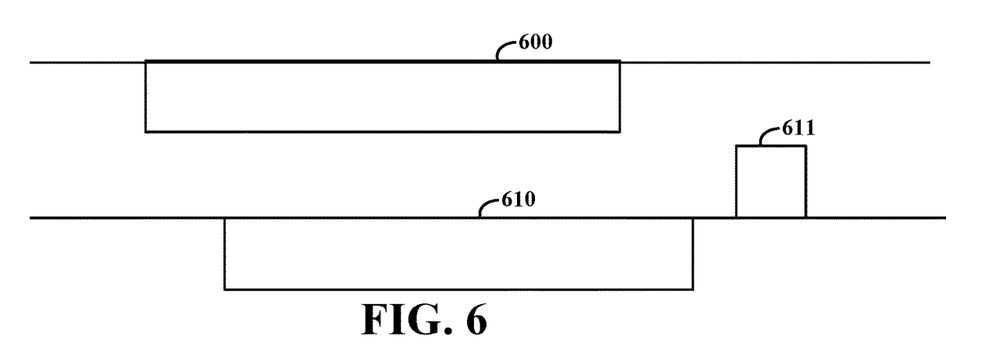
FIG. 6 is a diagram for communicating messages involving concurrent PPDUs with MLDs, in accordance with the present disclosure.

FIG. 6 is a diagram for communicating messages involving concurrent PPDUs 600 (PPDU1) and 610 (PPDU2) with MLDs, in accordance with the present disclosure. This approach may involve initiating a multi-link entity with T&R capability and a recipient multi-link entity without T&R capability. PPDU2's ending time may be the same as PPDU1's ending time, may be set so that it is not later than PPDU1's ending time under conditions in which PPDU1 solicits an immediate Ack/BA communication with SIFS inter-frame space, or may be set to be the same ending time as PPDU1's ending time.

In some instances, PPDU2's ending time is not related to PPDU1's ending time if both PPDU1 and PPDU2 don't solicit immediate Ack/BA (e.g., 611 for PPDU2) with SIFS inter-frame space (e.g., the ending times may be set independently). PPDU2's ending time may be set so that it is not later than PPDU1's ending time if PPDU1 solicits an immediate Ack/BA with SIFS inter-frame space. PPDU2's ending time may be set to be the same as PPDU12's ending time if both PPDU1 and PPDU2 solicit immediate Ack/BA with SIFS inter-frame space.

Figure 7:
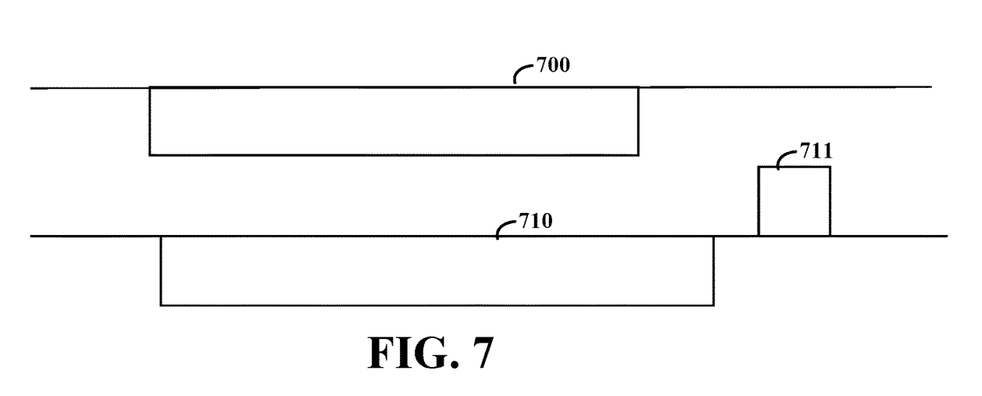
FIG. 7 is a diagram for communicating messages involving concurrent PPDUs with MLDs, in accordance with the present disclosure.

FIG. 7 is a diagram for communicating messages involving concurrent PPDUs 700 (PPDU1) and 710 (PPDU2) with MLDs, in accordance with the present disclosure. An initiating multi-link entity and recipient multi-link entity both having no T&R capability may be operated as follows. PPDU2's ending time may be the same as PPDU1's ending time, PPDU2's ending time may be set so that it is not later than PPDU1's ending time if PPDU1 solicits immediate Ack/BA with SIFS inter-frame space, or PPDU1's ending time may be set to be the same as PPDU2's ending time.

In a particular implementation, PPDU2's ending time may be set independent from/not related to PPDU1's ending time if both PPDU1 and PPDU2 don't solicit immediate Ack/BA (e.g., 711 for PPDU2) with SIFS inter-frame space. PPDU2's ending time may be set to be not later than PPDU1's ending time if PPDU1 solicits immediate Ack/BA with SIFS inter-frame space (and, e.g., PPDU2 does not). PPDU2's ending time may be set to be the same as PPDU1's ending time if both PPDU1 and PPDU2 solicit immediate Ack/BA with SIFS inter-frame space.

Certain implementations are directed to the communication of concurrent PPDUs (PPDU1 in a first link, and PPDU2 in a second link) from the same multi-link entity (or same entities in one device) to different multi-link entities in a different device. If the start time of PPDU2 is not earlier than the start time of PPDU1 and an initiating multi-link entity has T&R capability, PPDU2's ending time may be unrelated to PPDU1's ending time. For an initiating multi-link entity without T&R capability, PPDU2's ending time may be the same as PPDU1's ending time. In certain implementations, PPDU2's ending time is set not later than PPDU1's ending time if PPDU1 solicits immediate Ack/BA with SIFS inter-frame space but PPDU2 does not, and otherwise PPDU1's ending time is set to be the same as PPDU2's ending time.

If both PPDU1 and PPDU2 don't solicit immediate Ack/BA with SIFS inter-frame space, PPDU2's ending time is not related to PPDU1's ending time. If PPDU1 solicits immediate Ack/BA with SIFS inter-frame space but PPDU2 does not, PPDU2's ending time may be et not later than PPDU1's ending time. If both PPDU1 and PPDU2 solicit immediate Ack/BA with SIFS inter-frame space, PPDU2's ending time may be the same as PPDU1's ending time.

In some aspects of the disclosure, concurrent PPDUs from different multi-link entities are communicated over first and second links (PPDU1 and PPDU2) in different devices to the same multi-link entity (or multi-link entities in one device), as follows. If the start time of PPDU2 is not earlier than the start time of PPDU1 and the recipient multi-link entity has T&R capability, PPDU2's ending time may not be related to PPDU1's ending time. If the recipient multi-link entity has no T&R capability, PPDU2's ending time may be set the same as PPDU1's ending time. If PPDU1 solicits immediate Ack/BA with SIFS inter-frame space but PPDU2 does not, PPDU2's ending time may be set not later than PPDU1's ending time, and otherwise set to be the same.

If both PPDU1 and PPDU2 do not solicit immediate Ack/BA with SIFS inter-frame space, PPDU2's ending time may be set without relation to PPDU1's ending time. If PPDU1 solicits immediate Ack/BA with SIFS inter-frame space, PPDU2's ending time may be set to be not later than PPDU1's ending time. PPDU2's ending time may be set to be the same as PPDU1's ending time if both PPDU1 and PPDU2 solicit immediate Ack/BA with SIFS inter-frame space.

In a further implementation, concurrent PPDUs may be communicated from multi-link entities in different devices to multi-link entities in different devices. For instance, first and second multi-link entities may be different from third and fourth multi-link entities where the first and second multi-link entities are the source and destination of a first PPDU1 communication, and the third and fourth multi-link entities are the source and destination of a second PPDU2. In such conditions, PPDU2's ending time may be set without relation to PPDU1's ending time.

If the second and third multi-link entities are the same, and if the first and fourth multi-link entities are different, the first and second multi-link entities may be the source and destination of PPDU1 and the third and fourth multi-link entities may be the source and destination of PPDU2, such as may occur when the second multi-link entity has T&R capability. PPDU2's ending time may be set without relation to PPDU1's ending time.

If the second and third multi-link entities are the same, and the first and fourth multi-link entities are the same, the first and second multi-link entities may be the source and destination of PPDU1 and the third and fourth multi-link entities may be the source and destination of PPDU2. This may be implemented where the first and second multi-link entities have T&R capability, such that PPDU2's ending time is not related to PPDU1's ending time.

Figure 8:
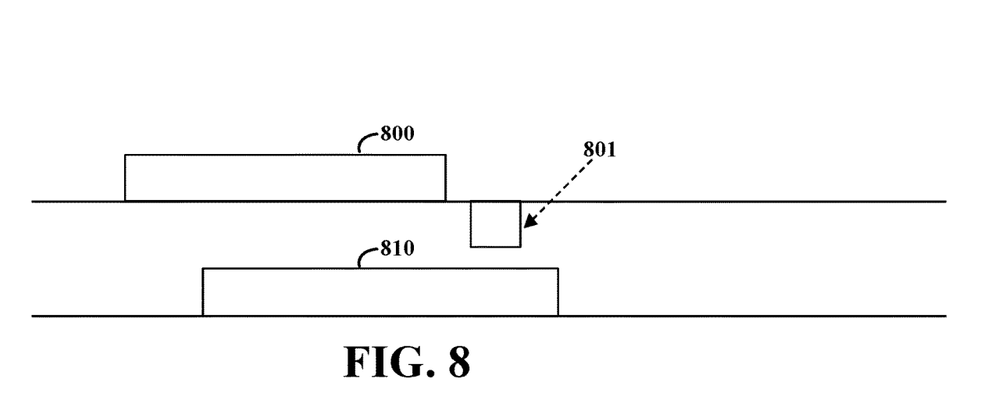
FIG. 8 is a diagram for communicating messages involving communications with a single-link station, in accordance with the present disclosure.

FIG. 8 is a diagram for communicating messages involving communications with a single-link (legacy) station, in accordance with the present disclosure. Such an approach may be implemented with a multi-link BSS. A first PPDU 800 is shown on a first link with an optional BA/ACK communication 801, and a second PPDU 810 is shown on a second link. This approach may, for example, be implemented to address issues relating to the use of MLDs with a legacy STA, such as when a single link EHT STA cannot determine another link's behavior, which may be challenging for use with a multi-link AP entity without T&R capability. Accordingly, a multi-link AP entity with T&R capability can allow the legacy STA, single link EHT STA to associate with it though any link. A multi-link AP entity without T&R capability can allow the legacy STA single link EHT STA to associate with it through a specific link. Further, enhanced distributed channel access (EDCA) can be disallowed in the specific link. A high efficiency (HE) trigger based (TB) PPDU, and EHT TB PPDU may be used for uplink transmission. A clear to send (CTS) signal may be transmitted in the specific link when another link is used for frame exchange, and the transmission of a neighbor BSS may be disabled by the CTS. A new Control frame may be transmitted in the specific link when another link is used for frame exchange. An EHT STA from a neighboring BSS may ignore the duration in the new control frame. The multi-link AP/STA entity may multiple links to transmit PPDUs in two links where two PPDUs start at the same and end at the same time. The legacy STA and single-link EHT STA may use the normal EDCA procedure to access the medium. All the transmissions at least include the link where the legacy STA (or multiple legacy STAs) are transmitting/receiving the PPDUs. The PPDUs in two links that are not successfully transmitted may be treated as a collision.

As examples, the Specification describes and/or illustrates aspects useful for implementing the claimed disclosure by way of various circuits or circuitry which may be illustrated as or using terms such as blocks, modules, device, system, unit, controller, MLD, AP, STA and/or other circuit-type depictions (e.g., reference numerals 110, 111, 112 and 120, 121, 122 as well as 131 of FIG. 1 may depict a block/module as described herein). Such circuits or circuitry may be used together with other elements to exemplify how certain embodiments may be carried out in the form or structures, steps, functions, operations, activities, etc., and may include various blocks/modules within to effect operations. As examples, wherein such circuits or circuitry may correspond to logic circuitry (which may refer to or include a code-programmed/configured CPU), in one example the logic circuitry may carry out a process or method (sometimes "algorithm") by performing transmission operations and related decisions as characterized herein, relative for example to transmission capabilities of other circuits involved in a communication scenario.

In certain of the above-discussed embodiments, one or more modules are discrete logic circuits or programmable logic circuits configured and arranged for implementing these operations/activities, as may be carried out in the approaches shown in and described in connection with FIGS. 2-8. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein for communications (e.g., setting a PPDU communication characteristic) is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], such as a first and second MLD or using first and second PPDUs, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, communications as initiated by a MLD AP may be utilized by a MLD STA, or with a variety of other communication circuitry. As another example, while certain reference is made to Wi-Fi type communications, various approaches herein may be utilized with other wireless communications approaches. Such modifications do not depart from the true spirit and scope of various aspects of the disclosure, including aspects set forth in the claims

What is claimed is:

1. A communications circuit comprising:
a multi-link device (MLD) including processing circuitry to communicate signals with one of a plurality of remote devices over multiple communications links, wherein the MLD and the one of the remote devices are to operate in one of first and second communication-specific configurations which are respectively:
transmitting a first physical layer convergence procedure protocol data unit (PPDU) in a first one of the multiple communication links while a second PPDU is communicated in a second one of the multiple communication links in response to a determination that the MLD and the one of the plurality of remote devices support transmission (Tx) on one link while concurrently receiving on another link for a pair of links; and
communicating a third PPDU in the first one of the multiple communications links with the ending time set based on a fourth PPDU communicated in the second one of the multiple communications links by:
in response to a determination by the MLD that the third and fourth PPDUs in the respective first and second links does not solicit an Ack/BA (acknowledge/block acknowledge) response in accordance with a short inter-frame space (SIFS) time interval, setting the ending time of the third PPDU in the first link without reference to an ending time of the fourth PPDU in the second link;
in response to a determination by the MLD that the third PPDU in the first link solicit an Ack/BA response in accordance with the SIFS, setting an ending time of the fourth PPDU in the second link as not later than an ending time of the third PPDU in the first link; and
in response to a determination by the MLD that both of the third and fourth PPDUs in the respective first and second links soliciting the Ack/BA responses in accordance with the SIFS, setting the ending time of the third and fourth PPDUs to the same ending time; and
wherein the MLD and the one or more remote devices operate in the first configuration based on a further announcement by the MLD that the MLD and the one or more remote devices support the transmission (Tx) on one link while concurrently receiving on the other link for the pair of links.

2. The communications circuit of claim 1, wherein the MLD is configured to operate in the first communication-specific configuration in response to both the MLD and the one of the remote devices being configured for concurrent transmission and reception of signals over respective communications links.

3. The communications circuit of claim 1, wherein the MLD is configured to operate in the second communication-specific configuration in response to:
a first one of the MLD and the one of the remote devices being configured for concurrent transmission and reception of signals over respective multiple communications links, and
a second one of the MLD and the one of the remote devices not having capability for concurrent transmission and reception of signals over the respective multiple communications links.

4. The communications circuit of claim 1, wherein the MLD is configured to:
operate in the first communication-specific configuration in response to both the MLD and the one of the remote devices being configured for concurrent transmission and reception of signals over respective multiple communications links; and
operate in the second communication-specific configuration in response to:
a first one of the MLD and the one of the remote devices being configured for concurrent transmission and reception of signals over respective multiple communications links, and
a second one of the MLD and the one of the remote devices not having capability for concurrent transmission and reception of signals over the respective multiple communications links.

5. The communications circuit of claim 1, wherein the MLD is configured to, in response to both the MLD and the one of the remote devices being configured for concurrent transmission and reception of signals over respective multiple communications links, set the ending time of the first PPDU communicated in one of the links without reference to the ending time of the second PPDU in the other one of the links.

6. The communications circuit of claim 1, wherein the MLD is configured and arranged to facilitate the communication of signals between the MLD and one of the remote devices by, in response to at least one of the remote devices requiring non-multi-link communications over a single link, communicating with the at least one of the remote devices over the single link.

7. The communications circuit of claim 1, wherein the MLD is configured and arranged to disable enhanced distributed channel access (EDCA) in other channels for transmissions thorough the other channels via which the MLD is communicating, in response to communicating on the single link.

8. The communications circuit of claim 1, wherein the MLD is configured to communicate the third PPDU in the first one of the multiple communications links with the ending time set based on the fourth PPDU communicated in the second one of the multiple communications links by setting the ending time of the third PPDU in the first link without reference to the ending time of the fourth PPDU in the second link, in response to the third and fourth PPDUs in the first and second links not soliciting the Ack/BA response in accordance with a SIFS time interval.

9. The communications circuit of claim 1, wherein the MLD is configured to communicate the third PPDU in the first one of the multiple communications links with the ending time set based on the fourth PPDU communicated in the second one of the multiple communications links by setting the ending time of the fourth PPDU in the second link as not later than the ending time of the third PPDU in the first link, in response to the third PPDU in the first link soliciting the Ack/BA response in accordance with a SIFS time interval.

10. The communications circuit of claim 1, wherein the MLD is configured to communicate the third PPDU in the first one of the multiple communications links with the ending time set based on the fourth PPDU communicated in the second one of the multiple communications links by setting the ending time of the third and fourth PPDUs to the same ending time, in response to both of the third and fourth PPDUs in the first and second links soliciting the Ack/BA responses in accordance with a common SIFS time interval.

11. An apparatus comprising:
a communications circuit configured and arranged to communicate with a plurality of remote devices over multiple communications links;
a multi-link device (MLD) including processing circuitry configured and arranged with the communications circuit to facilitate the communication of signals between the MLD and one of the remote devices, by:
in response to both the MLD and the one of the remote devices being configured for concurrent transmission and reception of signals over respective multiple communications links, communicating physical layer convergence procedure protocol data units (PPDUs) in respective ones of the multiple communications links, including transmitting a first PPDU in a first one of the multiple communications links while a second PPDU is communicated in a second one of the multiple communications links in response to a determination that the MLD and the one of the plurality of remote devices support transmission (Tx) on one link while concurrently receiving on another link for a pair of links; and
in response to one of the MLD and the one of the remote devices being configured for concurrent transmission and reception of signals over respective multiple communications links, and to the other one of the MLD and the one of the remote devices not having capability for concurrent transmission and reception of signals over the respective multiple communications links communicating a third PPDU in the first one of the multiple communications links with the ending time set based on a fourth PPDU communicated in the second one of the multiple communications links by:
in response to a determination by the MLD that the third and fourth PPDUs in the respective first and second links does not solicit an Ack/BA (acknowledge/block acknowledge) response in accordance with a short inter-frame space (SIFS) time interval, setting the ending time of the third PPDU in the first link without reference to an ending time of the fourth PPDU in the second link;
in response to a determination by the MLD that the third PPDU in the first link solicit an Ack/BA response in accordance with the SIFS, setting an ending time of the fourth PPDU in the second link as not later than an ending time of the third PPDU in the first link; and
in response to a determination by the MLD that both of the third and fourth PPDUs in the respective first and second links soliciting the Ack/BA responses in accordance with the SIFS, setting the ending time of the third and fourth PPDUs to the same ending time; and
wherein the MLD and the one or more remote devices are configured for concurrent transmission and reception of signals over respective multiple communications links based on a further announcement by the MLD that the MLD and the plurality of remote devices support the transmission (Tx) on one link while concurrently receiving on the other link for the pair of links.

12. The apparatus of claim 11, wherein the MLD is configured to communicate the PPDUs in respective ones of the multiple communications links using a backoff procedure, including delaying communications of a first PPDU in one of the multiple communications links based on communications in another one of the multiple communications links.

13. The apparatus of claim 11, wherein the MLD is configured to communicate the first PPDU in response to determining that communication of the first PPDU will not interfere with communication of a PPDU in a corresponding communication link.

14. A method comprising:
in a multi-link device (MLD) operable to facilitate the communication of signals between the MLD and one of a plurality of remote devices over multiple communications links, communicating physical layer convergence procedure protocol data units (PPDUs) in respective ones of the multiple communications links, including transmitting a first PPDU in a first one of the multiple communications links while a second PPDU is communicated in a second one of the multiple communications links, in response to a determination that the MLD and the one of the plurality of remote devices being configured to support concurrent transmission and reception of signals over the multiple communications links; and in response to one of the MLD and the one of the remote devices being configured for concurrent transmission and reception of signals over respective multiple communications links, and to the other one of the MLD and the one of the remote devices not having capability for concurrent transmission and reception of signals over the respective multiple communications links, communicating a third PPDU in the first one of the multiple communications links with the ending time set based on a fourth PPDU communicated in the second one of the multiple communications links by:

in response to a determination by the MLD that the third and fourth PPDUs in the respective first and second links does not solicit an Ack/BA (acknowledge/block acknowledge) response in accordance with a short inter-frame space (SIFS) time interval, setting the ending time of the third PPDU in the first link without reference to an ending time of the fourth PPDU in the second link;

in response to a determination by the MLD that the third PPDU in the first link solicit an Ack/BA response in accordance with the SIFS, setting an ending time of the fourth PPDU in the second link as not later than an ending time of the third PPDU in the first link; and in response to a determination by the MLD that both of the third and fourth PPDUs in the respective first and second links soliciting the Ack/BA responses in accordance with the SIFS, setting the ending time of the third and fourth PPDUs to the same ending time; and wherein the MLD and the one of the remote devices are configured for concurrent transmission and reception of signals over respective multiple communications links based on a further announcement by the MLD that the MLD and the plurality of remote devices support the transmission (Tx) on one link while concurrently receiving on the other link for the pair of links.

15. The method of claim 14, including setting the ending time of the first PPDU communicated in one of the links without reference to the ending time of the second PPDU in the other one of the links, in response to both the MLD and the one of the remote devices being configured for concurrent transmission and reception of signals over respective multiple communications links.

16. The method of claim 14, including communicating with at least one of the remote devices over a single link in response to the at least one of the remote devices requiring non-multi-link communications.

17. The method of claim 14, including using a backoff procedure involving delaying communications of a PPDU in one of the multiple communications links based on communications in another one of the multiple communications links.

* * * * *